United States Patent [19]

Smith

[11] 4,132,863
[45] Jan. 2, 1979

[54] AUTOMATIC GAIN AND RETURN LOSS COMPENSATING LINE CIRCUIT

[75] Inventor: Douglas C. Smith, Rumson, N.J.

[73] Assignee: Bell Telephone Laboratories, Incorporated, Murray Hill, N.J.

[21] Appl. No.: 862,577

[22] Filed: Dec. 20, 1977

[51] Int. Cl.² .............................................. H04M 1/76
[52] U.S. Cl. ................................. 179/16 F; 179/81 R
[58] Field of Search .......... 179/16 AA, 16 E, 16 EA, 179/16 F, 81 R, 170 G, 184, 186, 18 F, 18 FA, 170 R; 333/28 R

[56] References Cited

U.S. PATENT DOCUMENTS

| | | | |
|---|---|---|---|
| 2,620,402 | 12/1952 | Botsford et al. | 179/81 R |
| 2,629,783 | 2/1953 | Hopkins | 179/81 R |
| 2,777,994 | 1/1957 | Hurault | 333/28 R |
| 3,436,488 | 4/1969 | Barbato et al. | 179/99 |
| 3,810,247 | 5/1974 | Ono | 179/81 R |
| 4,027,259 | 5/1977 | Zellmer | 333/28 R |

OTHER PUBLICATIONS

"Automatic Level Control Telephone Circuits with Nonlinear Resistances," Kakehi, Review of the Electrical Communications Labs, vol. 22, No. 11-12, Nov.–Dec. 1974, pp. 1004–1018.
"An Improved Circuit for the Telephone Set," Bennett, Bell System Technical Journal, May 1953, pp. 611-626.

Primary Examiner—Kathleen H. Claffy
Assistant Examiner—Randall P. Myers
Attorney, Agent, or Firm—David H. Tannenbaum

[57] ABSTRACT

The disclosed T-type line compensation circuit reduces the gain and return loss variations when customer equipment is connected to a central office or PBX over telephone lines of various lengths. A linear resistor of a first series leg is thermally coupled, as a heat source, to a positive temperature coefficient (PTC) resistor of a second series leg. The shunt leg consists of a series connection of a bilateral zener diode, linear resistor, and varistor. The resistance value of both the second series leg and the shunt leg of the line circuit vary automatically with the direct current in the line to minimize gain variation due to telephone line length variation. The thermal feedback to the PTC resistor varies automatically with the direct current in the line to minimize return loss variations seen by the customer equipment.

21 Claims, 6 Drawing Figures

AUTOMATIC GAIN AND RETURN LOSS COMPENSATING LINE CIRCUIT

FIELD OF THE INVENTION

This invention relates to a line circuit for compensating telephone loop line and return loss variations due to variations in line lengths.

BACKGROUND OF THE INVENTION

In the telephone loop plant it is frequently necessary to transmit and receive signals over telephone lines of various lengths. These telephone loop length variations arise because of the varying distances between the subscriber locations and the associated central office location. The length of the telephone line from the central office to the subscriber determines the magnitude of the direct current which flows to the subscriber telephone set. Thus, when a modern telephone set is connected at the subscriber's premises, an equalizer incorporated therein will equalize transmitting and receiving levels and side-tone levels in accordance with the magnitude of the direct current flowing from the central office.

The circuit disclosed in U.S. Pat. No. 2,629,783 issued to H. F. Hopkins on Feb. 24, 1953 is typical of telephone equalizer circuitry. In Hopkins a current-sensitive resistance element is placed across the line terminals of the telephone circuit. As the loop length varies the direct current flowing through the loop will vary and if the current-sensitive element has the proper degree of non-linearity, the received and the transmitted levels at the telephone terminals will be held substantially constant, assuming constant inputs at the telephone transmitter. In Hopkins, the current-sensitive element is placed in shunt across the telephone circuit. A variable shunt across the telephone circuit imposes an additional burden on the side-tone balancing circuit, since with the variable shunt the loop impedance "looking out" from the telephone terminals will vary over a greater range than without the variable shunt. This additional burden is alleviated in Hopkins by employing in combination with the variable shunt equalizing circuit, a variable line balancing circuit which is also responsive to the loop direct current. Thus, Hopkins and other prior art does not compensate the telephone line to match a fixed impedance, but rather balances the telephone equipment to the varying line impedance.

A problem exists, however, when subscriber equipment has a conference capability in which multiple central office (CO) lines are connected to a single telephone. Since each CO line will be supplying current the total current received by the telephone will bear no relationship to the length of the connected CO lines. Additionally, in some customer equipment the telephones at the subscriber location are dc isolated from the CO lines and hence not supplied with a direct current which varies with loop length. Thus, the equalization approach used in the prior art will not be applicable.

In addition, the diversity of customer premises communication equipment has grown rapidly in recent years with some equipment requiring a constant impedance "looking out" from the customer's terminals, towards the central office or private business exchange (PBX), to match the impedance of the customer's equipment. In the telephone system any impedance mismatch between the telephone loop lines and the connecting central office or customer equipment may result in echoes or singing. A measure of this characteristic is called return loss which is an inverse measure of the transmission energy loss due to an impedance mismatch.

Accordingly, a need exists in the art for a line circuit which will automatically compensate for variations in line impedance to effect a better impedance match when connected to fixed impedance communications equipment.

Another need exists in the art for a line circuit which will automatically compensate for variations in line impedance as well as gain variations due to different telephone loop lengths.

Another need is to provide a gain and return loss compensating line circuit which reduces the unbalance caused by connection of multiple central office lines to one telephone.

Another need is to provide a gain and return loss compensating line circuit which operates independent of the telephone dc currents.

Another need is to provide a gain and return loss compensating line circuit which can be inserted in cascade with existing lines at the subscriber's location.

Yet another need is to provide a gain and return loss compensating line circuit which is economical, small and mechanically rugged.

SUMMARY OF THE INVENTION

In the instant application one embodiment of a gain and return loss compensating line circuit is disclosed which satisfies the existing needs. The disclosed four-terminal compensating line circuit is inserted in cascade with each CO line at a transformer input to the customer equipment. The transformer isolates the line dc currents from the dc currents of the telephone set. Since each CO line has its own compensating line circuit, unbalance is reduced when multiple CO lines are connected together.

One embodiment of the disclosed circuit is arranged as a "T" type attenuator having a first series leg, a shunt leg and a second series leg with a common connection node for one terminal of each leg. The shunt leg, which provides gain compensation, consists of a series connection of a bilateral zener diode, linear resistor, and bilateral varistor. A linear resistor of the first series leg is thermally coupled, as a heat source, to a positive temperature coefficient (PTC) resistor of the second series leg. Alternately, if the PTC can be made with low enough thermal inertia the first series leg is not necessary as an additional heat source and may be eliminated along with its audio bypass capacitor. This circuit would be better adapted to applications where the series resistance must be kept low for supervisory applications. Normally any such resistance in series with the line adds signal loss which decreases the effectiveness of the gain compensating circuit. However, the linear resistor of the first series leg is required to limit current and avoid saturation of the transformer on short CO loops. Since the PTC resistor is placed in series with the line such that the gain compensator's current flows through the PTC resistor, any gain variations caused by the PTC resistor are minimized by the gain compensating circuit while enabling the PTC resistor to provide the desired return loss improvement.

Return loss improvement requires the value of series resistance for short loops to be greater than the resistance for long loops. Thus, a PTC resistor was used as the series resistance. Since short loops have higher dc current, more heat is developed in the PTC resistor, and the thermally coupled linear resistor thus increasing the temperature and hence resistance of the PTC resistor. The temperature rise, and hence the resistance increase, of the PTC resistor is more pronounced when heat is coupled to it from an additional heat source, the linear resistor of the first series leg, of the compensator circuit. Thus, the impedance value of both the second series leg and the shunt leg of the line circuit vary automatically with the direct current in the CO loop in a manner to minimize gain variations when connected to CO loops of various lengths. The thermal feedback to the PTC resistor varies automatically with the direct current in the line in a manner to change its resistance to minimize return loss variations at both the customer and central office locations.

Accordingly, it is a feature of my invention to provide both an automatic gain and return loss compensating line circuit which uses series and shunt regulation circuitry to compensate for impedance and signal variations of various telephone loop lengths.

It is a feature of my invention to provide an automatic gain and return loss compensating circuit, utilizing a PTC resistor with thermal feedback, which can be used with protective coupler devices.

It is another feature of my invention to provide an automatic gain and return loss compensating circuit, utilizing a PTC resistor with thermal feedback, which can be used in a telephone station set.

Finally, it is a feature of my invention to provide a small, solid state mechanically rugged, yet economical compensating line circuit.

BRIEF DESCRIPTION OF THE DRAWINGS

The purpose and operation of the present invention, as well as additional objectives, advantages and features thereof, will be more fully appreciated from the illustrative embodiment shown in the drawing in which.

GENERAL DESCRIPTION

Figure 1:
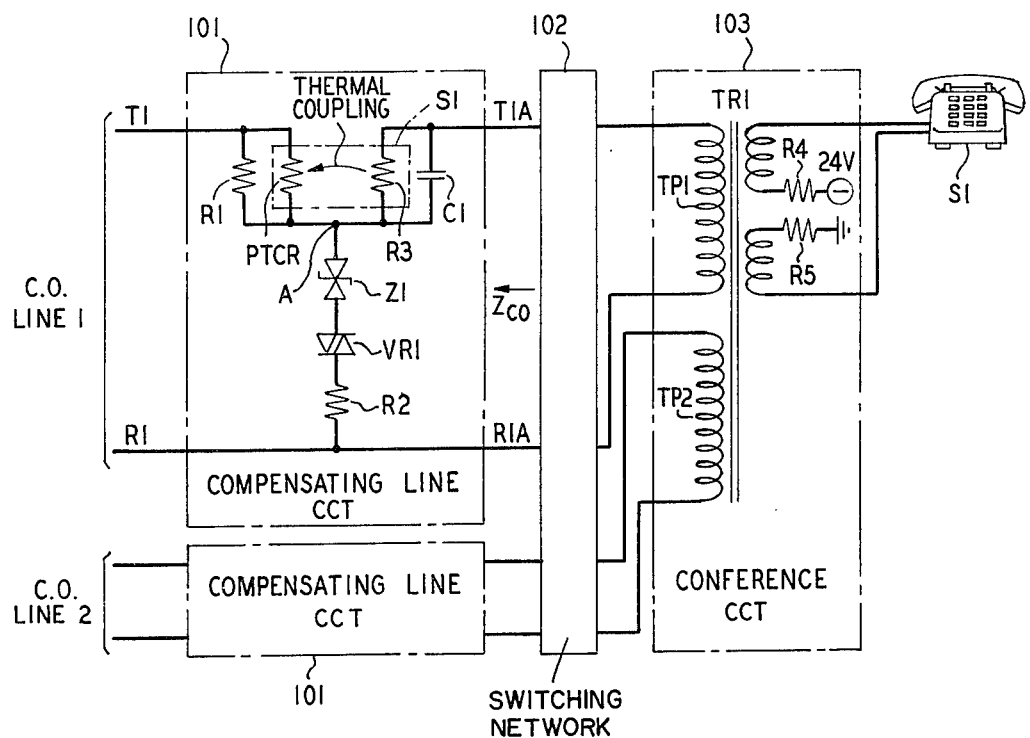
FIG. 1 shows an application of the compensating circuit for a conferencing arrangement.

Shown in FIG. 1 is an application of the automatic gain and return loss compensating line circuit in a customer key telephone system. The signaling and switching connections of the respective line circuit and station set have not been shown, but are well known in the prior art, for example, see U.S. Pat. No. 3,436,488 issued to R. E. Barbato et al. on Apr. 1, 1969. FIG. 1 shows a pair of central office (CO) lines, CO line 1 and CO line 2, of indeterminable length, each connected to a compensating line circuit 101. Each compensating line circuit 101 is connected to a primary winding of dc isolation transformer TR1 in conference circuit 103. The center tapped secondary of transformer TR1 provides $-24$ volt dc power through current limiting resistors R4 and R5 to key station set S1. The operating current to station set S1 is relatively constant since the distance between transformer TR1 and station set S1, both located on the same premises, is usually less than a thousand feet (1K ft). Since station set S1 is dc isolated from the lines, the built-in compensation circuitry of the station set S1 will not be able to compensate for signal and impedance variation when station set S1 is connected, via switching network 102, to either CO line 1 or CO line 2.

Figure 2:
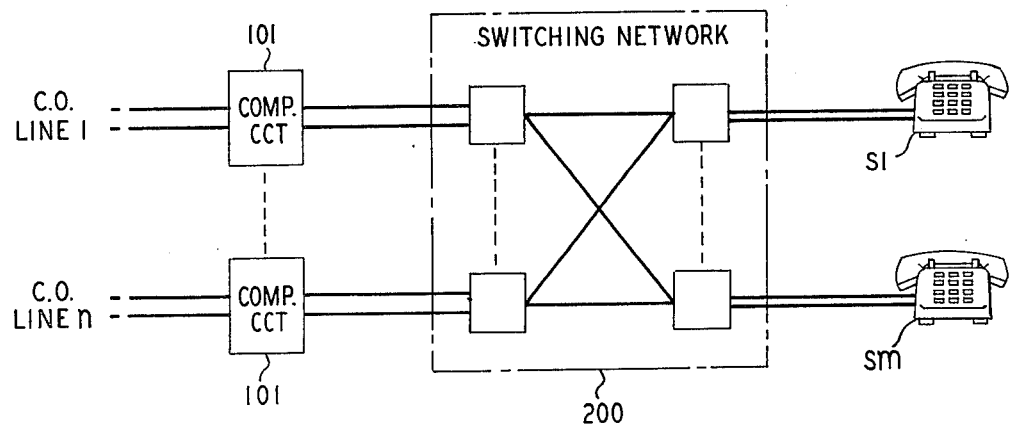
FIG. 2 shows a typical application of the compensating circuit in a customer switching system.

FIG. 2 illustrates an application of compensating line circuit 101 with customer premises switching network 200 which connects CO lines 1 through N to station sets S1 through SM.

Returning to FIG. 1, lead T1 of CO line 1 is connected to one terminal of the parallel combination of resistor R1 and positive temperature coefficient resistor PTCR. The other terminals of resistors R1 and PTCR are connected to node A. The series combination of bilateral zener diode Z1, bilateral varistor VR1 and resistor R2 is connected between node A and lead R1 of CO line 1. Lead R1 of CO line 1 is also connected to terminal R1A of transformer TR1. The parallel combination of resistor R3 and capacitor C1 is connected between node A and terminal T1A of transformer TR1. There exists thermal coupling between resistors R3 and PTCR which coupling can be via convection, radiation or conduction mode.

The characteristics of resistor PTCR is such that its resistance increases with increasing temperature. Increasing the temperature of resistor PTCR can be caused by ambient heating, internal heating or thermally coupled heat. Compared with the internal heating and coupled heating the effects of ambient heating is negligible in the design shown. The internal heat and coupled heat results from power dissipation in resistors R3 and PTCR and is greatest for short CO loop lengths. To minimize the response time of changes in resistance of resistor PTCR with changes in its temperature, it may be desirable that resistors R3 and PTCR share a common thermal conductive mounting. The thermal coupling shown in FIG. 1 occurs through medium S1 which couples thermal energy from resistor R3 to PTCR. For example, the medium S1 can be air or a common conductive mounting for more efficient thermal coupling.

COMPONENT SELECTION

Because of nonlinear component characteristics and the interactive cooperation between the components the selection of component values is done with less than mathematical certitude. The following paragraphs describe an approximate method of selecting component values. Custom tailoring of the value of each component to the particular application will further improve the effectiveness of the gain and return loss compensating line circuit.

Resistor R1, typically 300 to 400 ohms, is selected for the desired return loss improvement for short CO loop lengths, since for short loop lengths resistor PTCR is much larger in value than resistor R1 and thus only slightly shunts resistor R1. Resistor R3 together with resistor R1 is selected to limit short CO loop dc current to avoid saturation of transformer TR1. Thus, the value of resistor R3, typically about 300 ohms, is dependent upon the selected value of resistor R1. Since CO loop dc current is inversely proportional to CO loop length a short CO loop will develop a larger dc voltage between node A and lead R1 of FIG. 1. This dc voltage to CO loop length relationship is used to select the breakdown voltage of bilateral zener diode Z1 and thus determines the CO loop length beyond which the shunt leg gain compensation is out of the circuit. In the current design shunt gain compensation is desired for loop lengths of less than 1000 ohms dc resistance (12 kilofeet of 26 gauge cable). Bilateral zener Z1 and varistor VR1 are used to insure proper operation during dc current reversals. Short CO loop length signal levels are set by resistor R2, typically 400 to 500 ohms, with the assumption that both the loop resistance and resistor R1 equals zero ohms. Bilateral varistor VR1 is of the common variety of silicon carbide varistors and is inserted in the shunt arm to smooth the sharp impedance transition of bilateral zener diode Z1. Thus, the impedance changes of the shunt leg that occur when bilateral zener diode Z1 is turned "on" or "off" is more gradual which more smoothly and effectively equalizes the loop gain characteristics.

The characteristic of resistor PTCR as well as the thermal coupling between resistors R3 and resistor PTCR determines the loop length at which resistor PTCR increases resistance to improve return loss. It is desirable that the resistance of resistor PTCR be at maximum value (several kilohms) for CO loop lengths less than 2 to 3 Kft and at minimum value (about 50 ohms) for CO loop lengths above 6 Kft. Hence, for short loop lengths the combination of resistor R1 and PTCR is approximately equal to resistor R1 while at long loop lengths the resistance is approximately equal to the low value of resistor PTCR. The value of the combination of resistors R1 and PTCR changes gradually between these extreme values in a manner to effectively compensate for the impedance variations caused by the shunt gain compensator. Obviously, if resistor PTCR alone has the desired impedance/temperature characteristics no additional resistor R1 is required. Compensation capacitor C1 is selected at 2.15 $\mu f$ to bypass resistor R3 to prevent excessive signal loss at audio frequencies.

DETAILED DESCRIPTION

The operation of the gain and return loss compensating line circuit is described in the following paragraphs. When the loop from the central office is short, cable impedance and loss are low and the dc current flow is high. As a result, the signal level received across leads T1 and R1, of FIG. 1 will be high. The dc current flowing through resistor R3 and transformer primary TP1, forward biases the shunt leg consisting of bilateral zener diode Z1, bilateral varistor VR1 and resistor R2. The forward bias required to turn on the shunt leg is the voltage drop of the bilateral zener Z1 and the bilateral varistor VR1. Due to the bilateral nature of zener diode Z1, and varistor VR1, loop dc current flow in either direction will activate the equalizer. Once the shunt leg is biased "on" some of the dc and signal currents are shunted around the transformer primary TP1. Thus shunt regulator action results in minimizing the signal variations to transformer primary TP1 due to variations in CO loop length. Note that the resistor PTCR adds to the effect of the shunt regulator action by increasing its resistance when more dc current flows on short CO loop lengths.

If we ignore the effects of resistor R1 and PTCR for the moment, it is easy to recognize that, for short CO loops, the impedance of the shunt path when biased "on" will tend to reduce impedance Zco seen by transformer primary TP1 when looking towards the central office. In addition, the impedance seen at the central office will also be very low since there is little line impedance to isolate it from the low shunt path impedance terminating the line at the customer's location. Thus, the return loss at the central office, which can involve a hybrid conversion of a 4-wire facility to a 2-wire loop, will be very poor. If we ignore the effects of resistors R1, PTCR and R2, and bilateral varistor VR1, the impedance Zco will change rapidly when the threshold of bilateral zener diode Z1 is reached. The "sharp knee" characteristic of the bilateral zener diode Z1 is softened by the use of bilateral varistor VR1 and resistor R2. Resistor R2 also establishes a minimum impedance for the shunt path.

If we now consider the effects of resistors R1 and PTCR we see that they help to assure a minimum impedance in series with the CO loops thus improving the return loss at both the central office and customer's location.

Since resistor PTCR has a positive temperature coefficient of resistance, as the temperature of resistor PTCR increases its resistance value will increase. The temperature of resistor PTCR will increase with loop dc current due to the increased heat generated by its own power dissipation in addition to the heat coupled to it from resistor R3. The substantial additional heat coupled to resistor PTCR from resistor R3, which is typically the greatest heat source in the equalizer, will also increase with loop dc current. This increase in resistance of resistor PTCR tends to offset the lowering impedance of the shunt path with the overall effect that impedance Zco remains fairly constant as CO loop lengths get shorter.

The resistance of resistor PTCR cannot change its value instantaneously with changes in dc current and thus, when a key telephone user selects a CO line and initiates a call, the resistance of resistor PTCR begins to adjust its value according to the dc current flowing in the CO line. However, since the added resistance of resistor PTCR appears to the shunt equalizer as additional loop length the gain of the circuit remains almost constant as resistor PTCR heats up. Thus, any delay in impedance equalization will affect the return loss but not appreciably affect the gain equalization. Hence, dial tone will not vary in level while resistor PTCR is adjusting.

When the CO loop length is very short, the line resistance is about zero, the resistance of resistor PTCR and R1 combination is approximately equal to the resistance of resistor R1 and the shunt path is at its lowest resistance. As Co loop length is increased, the line resistance increases, the resistance of resistor PTCR and R1 combination decreases and the shunt leg impedance increases such that Zco approximately remains constant. At medium loop lengths, loop resistance of about 600 ohms, the reduced dc loop current does not sufficiently heat resistor PTCR and the total resistance of resistors PTCR and R1 approaches its lowest value leaving only the shunt equalization active. When the loop length increases to its maximum value the shunt equalization becomes an open circuit allowing the full signal to pass. Hence, the instant disclosure provides a circuit which equalizes both signal level and impedance variations over various CO loop lengths.

CIRCUIT PERFORMANCE

Figure 3:
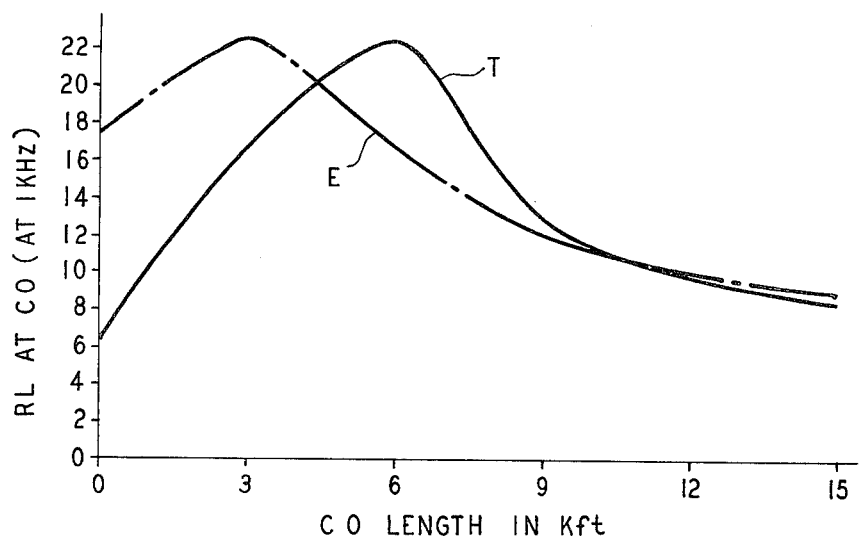
FIG. 3 and FIG. 4 compares the return loss characteristics of a line and conventional telephone with a compensated line terminated by fixed impedance equipment.
Figure 4:
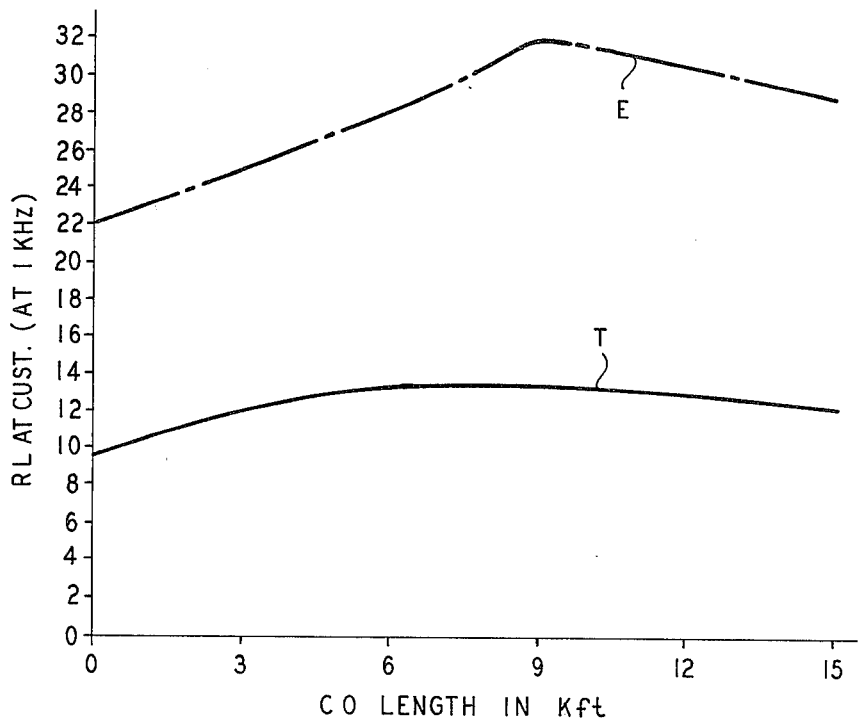

The performance of the gain and return loss compensating line circuit in equalizing transmission and receiving levels on CO loops equals or exceeds the performance of modern telephone sets on the same CO loops. The disclosed compensator also offers an improvement in the return loss at both the customer and the central office location over that obtainable with telephone sets. This improvement is illustrated in FIG. 3 and FIG. 4. FIG. 3 compares the return loss at the Central Office, with respect to 900 ohms and 2.16 μf, of a typical telephone set ("T" curve) with that of a fixed impedance (600 ohms and 2.16 μf) customer equipment ("E" curve) having the gain and return loss compensating line circuit in cascade with its input. It is seen that significant improvements are made in the return loss for CO loop length less than 4.5 kilofeet. Since a large number of customer installations have CO loop lengths which are less than 4.5 kilofeet, the improvement is even more significant. Also significant is the fact that typically the central office location is very sensitive to return loss since conversion from 4 wire to 2 wire operation usually involves the use of hybrid circuits which are sensitive to impedance mismatches. At longer CO loop lengths the loop itself starts to present an increasing influence on the return loss figures and hence the effects of the disclosed compensating line circuit decrease as shown in FIG. 3.

FIG. 4 compares return loss, with respect to 600 ohms and 2.16 μf, at customers' location of a typical telephone set with a fixed impedance equipment having the disclosed compensating line circuit in cascade with the input. Here the return loss improvement is seen not only at the short CO loop lengths, but also for longer CO loop lengths.

OTHER APPLICATIONS

In some existing key telephone systems a three party conference call may result in bridging two remote parties each with separate CO lines to a key telephone set party. In such a connection the direct current into the telephone does not accurately represent the length of the CO lines and hence the built-in telephone equalizer does less than an adequate compensation. Such mismatch could result in low signal levels and increased sidetone levels. In the instant application, as illustrated in FIG. 1, each CO line has its own equalizer, hence even if CO lines are switched together, via switching network 102, each CO line will be properly equalized. This results in correct loop equalization independent of the type of conferencing arrangements, thus assuring the proper signal and sidetone levels to the telephone user.

The functional simplicity of the disclosed compensating line circuit could make it possible to implement these functions with an integrated or hybrid-integrated circuit. In such a case, capacitor C1 could be externally mounted on such a clip.

Figure 5:
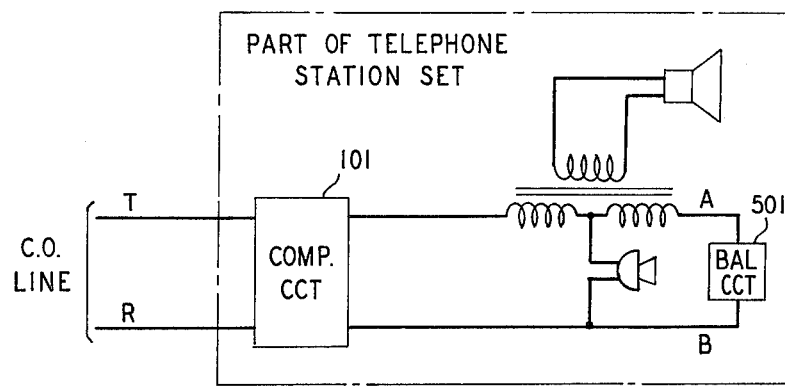
FIG. 5 shows a compensating circuit application in a telephone station set.

The disclosed compensating line circuit could also be implemented as part of the basic telephone as shown in FIG. 5. In such an application the conventional balancing circuit 501 could be replaced by a simpler resistor capacitor network. Telephone equalization would then take place in compensating line circuit 101. In a key telephone station set a line compensating circuit 101 could be placed in series with each connected CO line thus providing an improved multiple CO line conferencing arrangement. However, the values of the components may need to be redetermined for more complete equalization in these telephone applications.

Figure 6:
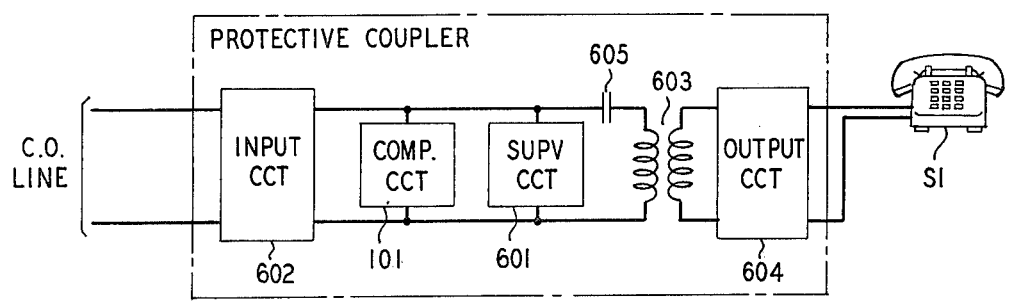
FIG. 6 shows a compensating circuit application in a protective coupler device.

Another application of the disclosed compensating line circuit could be in protective coupler circuit 600 shown in block form in FIG. 6 and described in the Angner et al pending application Ser. No. 840,593, filed Oct. 11, 1977 which is incorporated herein by reference. In the protective coupler circuit described by Angner et al and shown in FIG. 6, isolation transformer 603 already exists and hence disclosed compensating line circuit 101 need just replace the existing compensating circuit. Thus, little change, if any, need take place with input circuit 602, supervision circuit 601, output circuits 604, isolation capacitor 605 and transformer 603 of the existing Angner et al design. In the Angner et al. design the heat source could be a transistor in the supervision circuit instead of a resistor R3 of FIG. 1.

The concept of the disclosed compensating circuit is not limited to specific components but could be implemented with functional equivalents. In particular, the function of resistor PTCR could be implemented with a device having the desired resistance characteristic with changes in loop current.

Although a specific embodiment of the automatic gain and return loss circuit has been disclosed, other embodiments known to those skilled in the art could provide the same function without deviating from the scope of my invention.

What is claimed is:

1. In a telephone switching system having a plurality of subscriber telephone circuits, each said subscriber circuit connected by a dc isolation device to an individual wire pair loop, said loops of differing length, a transmission loss compensation circuit interposed between each said loop and each said dc isolation devices, said compensation circuit comprising,
    a first two-terminal resistive series arm with a first terminal connected to a first terminal of a dc isolating device and a second terminal connected to a common node,
    a two-terminal transmission loss compensating shunt arm with a first terminal connected to both a second terminal of said dc isolating device and a second wire of said loop and where said second terminal of said shunt arm is connected to said common node, said shunt arm containing a voltage sensitive switching means for connecting a nonlinear resistance between said first and second terminal of said shunt arm when dc voltage across said shunt arm exceeds a predetermined value,
    a second two-terminal resistive series arm having a resistance value which increases with dc current and with a first terminal connected to a first wire of said loop and a second terminal connected to said common node, said increases in resistance of said second series arm resulting from an increase in dc current flow in said loop which is inversely proportional to said loop lengths so that loop impedance seen by said subscriber equipment remains nearly constant, and wherein
    said shunt arm voltage sensitive switching means operates to adjust its resistance to compensate for resistance changes in said second series arm so as to maintain a constant transmission level to said subscriber equipment.

2. The invention of claim 1 wherein said resistance of said second resistive arm increases with temperature, said temperature increasing with said dc loop current.

3. The invention of claim 2 including a coupling means for receiving thermal energy from said first series arm and applying said received thermal energy to said second series arm.

4. The invention of claim 3 wherein said coupling means operates in a conductive mode.

5. The invention of claim 4 wherein said first series resistance and said second series resistance are mounted on said conductive coupling means.

6. The invention of claim 1 wherein said voltage switching means includes a bilateral zener diode.

7. The invention of claim 6 wherein said nonlinear resistance of said shunt arm is a bilateral varistor.

8. A telephone station set equalizer for compensating loop transmission loss and for maintaining a more constant impedance presented by a station set to a connected telephone loop whose dc currents vary with loop length, said equalizer including, a first two-terminal resistive series arm with a first terminal connected to a first terminal of a dc isolating device and a second terminal connected to a common node, a two-terminal transmission loss compensating shunt arm with a first terminal connected to both a second terminal of said dc isolating device and a second wire of said loop and where said second terminal of said shunt arm is connected to said common node, said shunt arm containing a voltage sensitive switching means for connecting a nonlinear resistance between said first and second terminal of said shunt arm when dc voltage across said shunt arm exceeds a predetermined value so that said shunt arm compensates for loop transmission loss variations due to said connected telephone loop, and a second two-terminal resistive series arm having a first terminal connected to a first wire of said loop and a second terminal connected to said common node, said second resistive arm having a resistance value which increases with dc loop current so that said equalizer presents a more constant impedance to said connected telephone loop.

9. The invention of claim 8 wherein said resistance of said second resistive arm increases with temperature, said temperature increasing with said dc loop current.

10. The invention of claim 9 including a coupling means for receiving thermal energy from said first series arm and applying said received thermal energy to said second series arm.

11. The invention of claim 10 wherein said coupling means operates in a conductive mode.

12. The invention of claim 11 wherein said first series resistance and said second series resistance are mounted on said conductive coupling means.

13. The invention of claim 8 wherein said voltage switching means includes a bilateral zener diode.

14. The invention of claim 13 wherein said nonlinear resistance of said shunt arm is a bilateral varistor.

15. In a dc isolating telephone line circuit connected between a telephone loop and customer equipment, a line loss compensation circuit comprising, a first two-terminal resistive series arm with a first terminal connected to a first terminal of a dc isolating device and a second terminal connected to a common node, a two-terminal transmission loss compensating shunt arm with a first terminal connected to both a second terminal of said dc isolating device and a second wire of said loop and where said second terminal of said shunt arm is connected to said common node, said shunt arm containing a voltage sensitive switching means for connecting a nonlinear resistance between said first and second terminal of said shunt arm when dc voltage across said shunt arm exceeds a predetermined value, so that said shunt arm compensates for loop transmission loss variations due to said connected telephone loop, and a second two-terminal resistive series arm having a first resistance value which increases with temperature and having a first terminal connected to a first wire of said loop and a second terminal connected to said common node, said second resistive arm having said first resistance value which increases with temperature caused by increases in the dc loop current so that a more constant impedance is presented to said connected telephone loop and said customer equipment.

16. The invention of claim 15 wherein said resistance of said second resistive arm increases with temperature, said temperature increasing with said dc loop current.

17. The invention of claim 16 including a coupling means for receiving thermal energy from said first series arm and applying said received thermal energy to said second series arm.

18. The invention of claim 17 wherein said coupling means operates in a conductive mode.

19. The invention of claim 18 wherein said first series resistance and said second series resistance are mounted on said conductive coupling means.

20. The invention of claim 15 wherein said voltage switching means includes a bilateral zener diode.

21. The invention of claim 20 wherein said nonlinear resistance of said shunt arm is a bilateral varistor.

* * * * *